United States Patent
Aoyama et al.

(10) Patent No.: US 12,049,135 B2
(45) Date of Patent: Jul. 30, 2024

(54) DISPLAY DEVICE, DISPLAY CONTROL METHOD, AND NON-TRANSITORY COMPUTER-READABLE RECORDING MEDIUM

(71) Applicant: Honda Motor Co., Ltd., Tokyo (JP)

(72) Inventors: Hirokazu Aoyama, Tokyo (JP); Yoshinari Sugita, Tokyo (JP); Shumpei Tahara, Tokyo (JP); Takuya Sato, Tokyo (JP); Takahito Yoshida, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 373 days.

(21) Appl. No.: 17/461,913

(22) Filed: Aug. 30, 2021

(65) Prior Publication Data

US 2022/0089023 A1 Mar. 24, 2022

(30) Foreign Application Priority Data

Sep. 23, 2020 (JP) ................................ 2020-158573

(51) Int. Cl.
*B60K 31/18* (2006.01)
*B60K 35/00* (2024.01)
(Continued)

(52) U.S. Cl.
CPC ............ *B60K 31/185* (2013.01); *B60K 35/00* (2013.01); *B60K 35/28* (2024.01); *B60K 35/81* (2024.01);
(Continued)

(58) Field of Classification Search
CPC .............................. B60K 31/185; B60K 35/00; B60K 2370/166; B60K 2370/167;
(Continued)

(56) References Cited

U.S. PATENT DOCUMENTS 10,661,812 B2    5/2020   Matsushita et al.
11,203,360 B2    12/2021  Mimura et al.
(Continued)

FOREIGN PATENT DOCUMENTS

CN    108973682    12/2018
CN    109383292    2/2019
(Continued)

OTHER PUBLICATIONS

Office Action of China Counterpart Application, with English translation thereof, issued on Jul. 17, 2023, pp. 1-17.
"Office Action of Japan Counterpart Application" with English translation thereof, issued on May 31, 2022, p. 1-p. 6.

*Primary Examiner* — Tyler J Lee
*Assistant Examiner* — Kimia Kohankhaki
(74) *Attorney, Agent, or Firm* — JCIPRNET

(57) ABSTRACT

A display device, a display control method, and a non-transitory computer-readable recording medium are disclosed. The display device of an embodiment is mounted on a vehicle and includes: a display part; and a display controller displaying a first image showing a speed range controllable by a driving controller that controls a speed of the vehicle to a constant speed, a second image showing a target vehicle speed of the vehicle, and a third image showing the speed of the vehicle on the display part. The display controller displays the second image in association with an upper limit or a lower limit of the first image on the display part when the speed of the vehicle deviates from the speed range.

15 Claims, 12 Drawing Sheets

(51) Int. Cl.
*B60K 35/28* (2024.01)
*B60K 35/81* (2024.01)

(52) U.S. Cl.
CPC .. *B60K 2360/166* (2024.01); *B60K 2360/167* (2024.01); *B60K 2360/168* (2024.01); *B60K 2360/169* (2024.01)

(58) Field of Classification Search
CPC ........ B60K 2370/168; B60K 2370/169; B60K 2370/52; B60K 2310/22; B60K 2370/1523; B60K 2370/171; B60K 2370/172; B60K 2370/175; B60K 2370/178; B60W 30/146; B60W 50/14; B60W 2050/146; B60W 2520/10; G07C 5/0825; G07C 5/0808
See application file for complete search history.

(56) References Cited

U.S. PATENT DOCUMENTS

| | | | |
|---|---|---|---|
| 11,364,930 B2 | 6/2022 | Kubota et al. | |
| 2002/0133285 A1* | 9/2002 | Hirasago | B60K 35/00 |
| | | | 701/96 |
| 2018/0345991 A1 | 12/2018 | Mimura et al. | |
| 2020/0062276 A1* | 2/2020 | Yuan | B60K 37/06 |

FOREIGN PATENT DOCUMENTS

| | | |
|---|---|---|
| CN | 110709271 | 1/2020 |
| CN | 110709272 | 1/2020 |
| JP | 2004142689 | 5/2004 |
| JP | 2017222362 | 12/2017 |

* cited by examiner

DISPLAY DEVICE, DISPLAY CONTROL METHOD, AND NON-TRANSITORY COMPUTER-READABLE RECORDING MEDIUM

CROSS-REFERENCE TO RELATED APPLICATION

This application claims the priority benefits of Japanese application no. 2020-158573, filed on Sep. 23, 2020. The entirety of the above-mentioned patent application is hereby incorporated by reference herein and made a part of this specification.

BACKGROUND

Technical Field

The disclosure relates to a display device, a display control method, and a non-transitory computer-readable recording medium.

Description of Related Art

In recent years, research has been conducted on automatically controlling the traveling of vehicles. In connection with this, a downhill speed control device is known, which controls an amount of braking so that an actual vehicle speed matches a target vehicle speed at the time of downhill traveling (for example, see Patent Document 1).

RELATED ART

Patent Document

[Patent Document 1] Japanese Laid-Open No. 2004-142689

However, in the conventional technique, an occupant is not notified of a range that can be controlled by the control device. Therefore, it may be difficult for the occupant to recognize a state of driving control performed by the control device.

SUMMARY

A display device, a display control method, and a non-transitory computer-readable recording medium according to the disclosure adopt the following configurations.

(1): A display device according to one aspect of the disclosure is mounted on a vehicle. The display device includes: a display part; and a display controller displaying a first image showing a speed range controllable by a driving controller that controls a speed of the vehicle to a constant speed, a second image showing a target vehicle speed of the vehicle, and a third image showing the speed of the vehicle on the display part. The display controller displays the second image in association with an upper limit or a lower limit of the first image on the display part when the speed of the vehicle deviates from the speed range.

(2): In the aspect of (1) above, the display controller displays the second image in association with the upper limit of the first image on the display part when the speed of the vehicle is higher than the upper limit of the speed range.

(3): In the aspect of (1) above, the display controller displays the second image in association with the lower limit of the first image on the display part when the speed of the vehicle is lower than the lower limit of the speed range.

(4): In any aspect of (1) to (3) above, the driving controller performs control of changing the target vehicle speed by an operation on a driving operator performed by an occupant of the vehicle, and the display controller displays the second image in association with the upper limit or the lower limit of the first image on the display part when the speed of the vehicle deviates from the speed range during execution of the control of changing the target vehicle speed.

(5): In any aspect of (1) to (4) above, the display controller changes a display mode of the second image when the speed of the vehicle deviates from the speed range.

(6): In any aspect of (1) to (5) above, the display device further includes a reception part receiving an operation of the occupant of the vehicle, and when the reception part receives a start instruction of speed control of the vehicle, the display controller displays an image showing that the start instruction is received for a predetermined time on the display part, and then displays the first image, the second image, and the third image on the display part.

(7): In the aspect of (6) above, the display controller displays an image showing that execution of speed control performed by the driving controller is in a standby state together with the first image, the second image, and the third image on the display part.

(8): In the aspect of (7) above, the driving controller executes speed control when a state of the vehicle satisfies an execution condition of the speed control performed by the driving controller, and when the speed control performed by the driving controller enters an execution state, the display controller differentiates at least one display mode of the first image, the second image, and the third image from a display mode of the standby state.

(9): In the aspect of (6) or (7) above, the display device further includes a reception part receiving an operation of the occupant of the vehicle, and when the reception part receives an end instruction of speed control of the vehicle, the display controller ends display of the first image, the second image, and the third image, and displays an image showing that the end instruction is received for a predetermined time on the display part.

(10): A display control method according to another aspect of the disclosure is provided for a computer of a display device mounted on a vehicle to display a first image showing a speed range controllable by a driving controller that controls a speed of the vehicle to a constant speed, a second image showing a target vehicle speed of the vehicle, and a third image showing the speed of the vehicle on a display part, and display the second image in association with an upper limit or a lower limit of the first image on the display part when the speed of the vehicle deviates from the speed range.

(11): A non-transitory computer-readable recording medium storing a program according to another aspect of the disclosure is provided. The program is for a computer of a display device mounted on a vehicle to display a first image showing a speed range controllable by a driving controller that controls a speed of the vehicle to a constant speed, a second image showing a target vehicle speed of the vehicle, and a third image showing the speed of the vehicle on a display part, and display the second image in association with an upper limit or a lower limit of the first image on the display part when the speed of the vehicle deviates from the speed range.

DESCRIPTION OF THE EMBODIMENTS

According to an embodiment of the disclosure, it provides a display device, a display control method, and a program that make it easy for the occupant to recognize the state of driving control.

Hereinafter, embodiments of a display device, a display control method, and a program of the disclosure will be described with reference to the drawings. The embodiments illustrate an example in which a state of driving control for a vehicle is displayed on the display device when the driving control of the vehicle is performed. The driving control refers to, for example, controlling at least one or both of the steering and speed of the vehicle. The driving control includes, for example, CC (Cruise Control) that travels at a constant speed, ACC (Adaptive Cruise Control) that follows a preceding vehicle, LKAS (Lane Keeping Assistance System) that travels by keeping the traveling lane, etc. In addition, CC includes, for example, HDC (Hill Descent Control) and DAC (Downhill Assist Control) that perform constant speed traveling at a predetermined speed or lower, without being operated by an occupant, on a slope such as a downward slope (downhill).

[Overall Configuration]

Figure 1:
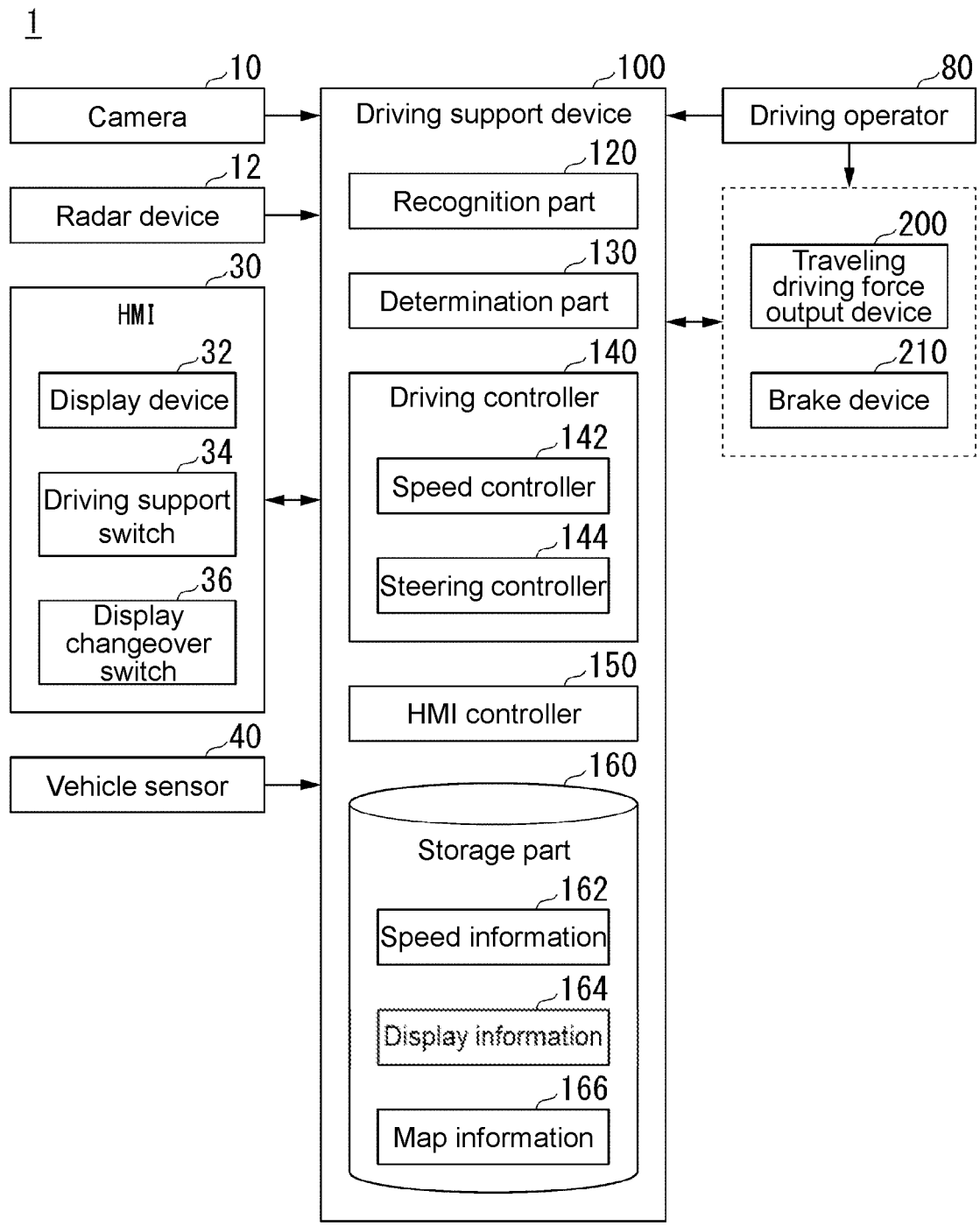
FIG. 1 is a configuration diagram of the vehicle system 1 including the control device according to an embodiment.

FIG. 1 is a configuration diagram of a vehicle system 1 using the display device according to the embodiment. A vehicle on which the vehicle system 1 is mounted (hereinafter referred to as vehicle M) is, for example, a two-wheeled vehicle, a three-wheeled vehicle or a four-wheeled vehicle, and a drive source thereof includes an internal combustion engine such as a diesel engine or a gasoline engine, an electric motor or a combination of these. The electric motor operates by using electric power generated by a generator connected to the internal combustion engine or electric power discharged by a secondary battery or a fuel cell.

The vehicle system 1 includes, for example, a camera 10, a radar device 12, an HMI (Human Machine Interface) 30, a vehicle sensor 40, a driving operator 80, a driving support device 100, a traveling driving force output device 200, and a brake device 210. These devices and machines are connected to each other by a multiplex communication line such as a CAN (Controller Area Network) communication line, a serial communication line, a wireless communication network, etc. The configuration shown in FIG. 1 is merely an example, and a part of the configuration may be omitted or another configuration may be added. The combination of the HMI 30 and an HMI controller 150 described later is an example of "display device".

The camera 10 is, for example, a digital camera using a solid-state imaging element such as a CCD (Charge Coupled Device) and a CMOS (Complementary Metal Oxide Semiconductor). The camera 10 is attached to any position on the vehicle M. When imaging the front, the camera 10 is attached to the upper part of a front windshield or the back surface of a rearview mirror. The camera 10 periodically and repeatedly images the periphery of the vehicle M, for example. The camera 10 may be a stereo camera.

The radar device 12 radiates radio waves such as millimeter waves to the periphery the vehicle M, and detects radio waves (reflected waves) reflected by an object to detect at least the position (distance and orientation) of the object. The radar device 12 is attached to any position on the vehicle M. The radar device 12 may detect the position and speed of the object by FMCW (Frequency Modulated Continuous Wave).

The HMI 30 presents various information to an occupant of the vehicle M (which may be a driver or a passenger) and accepts an input operation of the occupant. The HMI 30 includes, for example, a display device 32, a driving support switch 34, and a display changeover switch 36. The display device 32 is an example of "display part". Further, the HMI 30 may include a speaker, a microphone, a buzzer, a touch panel, etc. The driving support switch 34, the display changeover switch 36, the microphone, and the touch panel are examples of "reception part".

Figure 2:
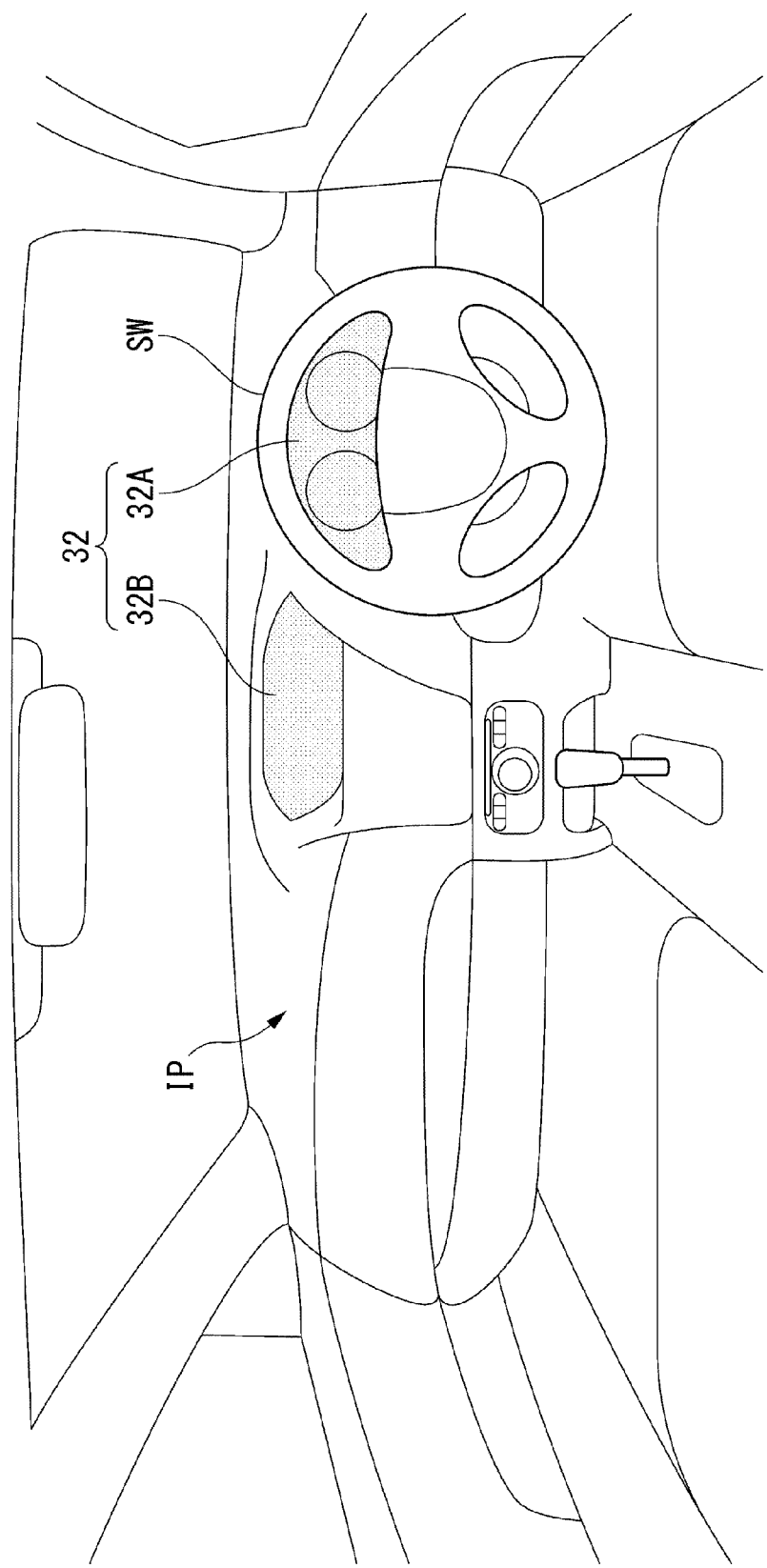
FIG. 2 is a diagram schematically showing the interior of the vehicle M.

FIG. 2 is a diagram schematically showing the interior of the vehicle M. The display device 32 has, for example, a first display part 32A and a second display part 32B. The first display part 32A and the second display part 32B may be, for example, indicators (hereinafter referred to as "IND" if necessary) that display the state of the vehicle M or an in-vehicle device by a simple LED (Light Emitting Diode) display or the like, or may be MIDs (Multi Information Display). In the case of MID, the first display part 32A and the second display part 32B are, for example, LCDs (Liquid Crystal Display), organic EL (Electroluminescence) display devices, etc. The images displayed on the first display part 32A and the second display part 32B are controlled by the HMI controller 150.

The first display part 32A is provided, for example, near the front of the driver's seat (the seat closest to a steering wheel SW) in an instrument panel IP, and is installed at a position where the occupant can see through a gap of the steering wheel SW or through the steering wheel SW. On the first display part 32A, information related to the manual driving of the vehicle M or the driving control of the driving controller 140 is displayed as an image. The information required for the traveling of the vehicle M during the manual driving refers to, for example, the speed of the vehicle M, the engine speed, the remaining fuel amount, the radiator water temperature, the mileage, and other information. The information related to the driving control refers to, for example, information related to the state of the driving control, information related to the recognition result of a recognition part 120 and the detection result of the vehicle sensor 40. The state of the driving control includes, for example, a state where the driving controller 140 is not operating, a state where the driving controller 140 is in operation and waiting for the execution of the driving control (standby state), and a state where the driving control of the driving controller 140 is being executed (active state). The information related to the recognition result of the recognition part 120 and the detection result of the vehicle sensor 40 includes, for example, information related to the posture (vehicle body posture) of the vehicle M, information related to the slope (gradient) of the traveling road, information related to the lane (road lane marking), etc. Further, the information related to the driving control may include a part or all of the information required for the traveling of the vehicle M during the manual driving.

The second display part 32B is installed in the center of the instrument panel IP, for example. The second display part 32B displays information that can be displayed by the first display part 32A. Further, the second display part 32B may display an image of the navigation result of a navigation device (not shown), an image read from a television program or a DVD, and a content such as a movie downloaded from an external device via an in-vehicle communication device (not shown).

Returning to FIG. 1, the driving support switch 34 is a switch that receives a start instruction or an end instruction of the driving control performed by the driving controller 140 for the vehicle M. The driving support switch 34 receives the start instruction or the end instruction of the driving control by an on/off switch or the like by the operation of the occupant of the vehicle M. The driving support switch 34 may be provided, for example, for each type of driving control executed by the driving controller 140. The display changeover switch 36 is a switch for switching between display and non-display of an image on the display device 32. The driving support switch 34 and the display changeover switch 36 may be, for example, a GUI (Graphical User Interface) switch displayed on the display device 32 or a mechanical switch such as a dial type switch, a lever type switch, and a button type switch.

The vehicle sensor 40 includes a position sensor that detects the position of the vehicle M, a vehicle speed sensor that detects the vehicle speed, a yaw rate sensor that detects an angular speed around the vertical axis, an orientation sensor that detects the direction of the vehicle M, etc. The position sensor is, for example, a GNSS (Global Navigation Satellite System) receiver that identifies the position (for example, latitude and longitude) of the vehicle M based on a signal received from a GNSS satellite. Further, the vehicle sensor 40 may include a G sensor capable of acquiring a change status of the vehicle body posture due to acceleration, deceleration, and load of the vehicle M. For example, the G sensor can detect the inclination of the vehicle M by measuring the speed change with respect to three axes such as up and down, left and right, and front and back. In addition, the vehicle sensor 40 may detect the posture of the vehicle M by comparing the degree of load of a suspension system provided for each wheel.

The driving operator 80 includes, for example, an accelerator pedal, a brake pedal, a shift lever, the steering wheel SW, a direction indicator, a joystick, and other operators. A sensor that detects the operation amount or whether an operation is performed is attached to the driving operator 80, and the detection result thereof is output to the driving support device 100 or some or all of the traveling driving force output device 200, the brake device 210, and a steering device (not shown).

The driving support device 100 includes, for example, the recognition part 120, a determination part 130, the driving controller 140, the HMI controller 150, and a storage part 160. The recognition part 120, the determination part 130, the driving controller 140, and the HMI controller 150 are realized by, for example, a processor such as a CPU (Central Processing Unit) or a GPU (Graphics Processing Unit) executing a program (software). In addition, some or all of these components may be realized by hardware (circuit part; including circuitry) such as LSI (Large Scale Integration), ASIC (Application Specific Integrated Circuit), and FPGA (Field-Programmable Gate Array), or may be realized by collaboration of software and hardware. The program may be stored in the storage part 160 of the driving support device 100 in advance, or may be stored in a removable storage medium such as a DVD or a CD-ROM and installed in the storage part 160 by mounting the storage medium on a drive device. The HMI controller 150 is an example of "display controller".

The storage part 160 is realized by, for example, an HDD, a flash memory, an EEPROM (Electrically Erasable Programmable Read Only Memory), a ROM (Read Only Memory), a RAM (Random Access Memory) or the like. The storage part 160 stores, for example, speed information 162, display information 164, map information 166, a program read and executed by a processor, etc.

The speed information 162 includes, for example, information related to a speed range controllable by the driving controller 140 and information related to the target vehicle speed of the vehicle M. The controllable speed range refers to, for example, a speed range for controlling traveling at a constant speed for the vehicle M. The controllable speed range refers to, for example, a range of speed estimated to be capable of automatically controlling the speed of the vehicle M in a state where the occupant does not operate the driving operator 80 (for example, the accelerator pedal and the brake pedal) during downhill traveling in the HDC. The speed range may be set variably depending on the gradient angle of the road traveled and the vehicle type. The target vehicle speed is a target value of the speed of the vehicle M in the speed control of the driving controller 140. The target vehicle speed may be adjusted by, for example, an operation of the accelerator pedal or the brake pedal performed by the occupant. The display information 164 includes, for example, information related to a display mode of an image to be displayed on the display device 32 according to the state of the driving control of the driving controller 140. The display mode includes, for example, the type of the image (for example, icon image and character image), color, size, line type and pattern of the image, character font, brightness of the image, presence or absence of blinking display, presence or absence of animation display, etc. The map information 166 includes, for example, road shape (road gradient and curvature) and POI (Point Of Interest) information associated with the position information (for example, latitude and longitude). Further, the map information 166 may include traffic regulation information such as information on the center of the lane or information on the boundary of the lane, address information (address/zip code), facility information, telephone number information, etc. The map information 166 may be updated at any time by the communication device of the vehicle M communicating with an external device.

The recognition part 120 recognizes (detects) an object existing around the vehicle M based on the information input from the camera 10 and the radar device 12. The object recognized by the recognition part 120 is a three-dimensional object or a two-dimensional object. The three-dimensional object includes, for example, a bicycle, a motorcycle, a four-wheeled vehicle, a pedestrian, a road sign, a utility pole, a guardrail, a falling object, etc. The two-dimensional object includes, for example, a road marking or a lane marking drawn on the road. In addition, the recognition part 120 recognizes a stop line, an obstacle, a red light, a tollhouse, and other road events. In the recognition, for example, a recognition result based on the map information 166 may be added.

In addition, the recognition part 120 recognizes the gradient angle of the road on which the vehicle M travels from the posture of the vehicle M detected by the vehicle sensor 40. Further, the recognition part 120 may refer to the map information 166 based on the position of the vehicle M detected by the vehicle sensor 40 and acquire the gradient angle of the road associated with the position of the vehicle M.

The determination part 130 determines whether the start instruction or the end instruction of the driving control is received by the driving support switch 34, and whether the image is set to display or non-display by the display changeover switch 36. Further, the determination part 130 determines, for example, the state of the vehicle M based on the recognition result of the recognition part 120, and whether the condition for switching the state of the driving control is satisfied. Further, the determination part 130 outputs the determination result to the driving controller 140, and sets the driving controller 140 to the standby state or the active state. The details of the function of the determination part 130 will be described later.

The driving controller 140 includes, for example, a speed controller 142 and a steering controller 144. For example, based on the determination result of the determination part 130, the driving controller 140 operates one or both of the speed controller 142 and the steering controller 144 to set to the standby state or the active state and execute the driving control for the vehicle M. For example, in the case of the active state, based on the recognition result of the recognition part 120 and the detection result of the vehicle sensor 40, the speed controller 142 controls the speed of the vehicle M to a constant speed by controlling one or both of the traveling driving force output device 200 and the brake device 210 so that the speed of the vehicle M approaches the target vehicle speed within the controllable speed range. The "constant speed" may include a predetermined speed range. For example, assuming that the constant speed is 14 [km/h], a predetermined speed range of, for example, 13 to 15 [km/h] may be included. The speed controller 142 acquires information related to the speed range and the target vehicle speed from the speed information 162 of the storage part 160. In addition, in the case of the standby state, based on the operation of the accelerator pedal or the brake pedal of the driving operator 80 performed by the occupant, the speed controller 142 changes (adjusts) the target vehicle speed, and registers (updates) the changed target vehicle speed in the speed information 162.

For example, in the case of the active state, based on the recognition result of the recognition part 120 and the detection result of the vehicle sensor 40, the steering controller 144 controls the steering device, etc. so that the vehicle M travels at a predetermined position. For example, when executing the LKAS control, based on the position information of the vehicle M, the steering controller 144 controls the steering device so that the vehicle M does not deviate from the traveling lane. The processing of the speed controller 142 and the steering controller 144 is realized by, for example, a combination of feedforward control and feedback control. In the case of the standby state, the steering controller 144 may change the parameters required for steering control based on the operation of the steering wheel SW of the driving operator 80 performed by the occupant. The information on the above parameters may be stored in the storage part 160.

The traveling driving force output device 200 outputs a traveling driving force (torque) for the vehicle M to travel to the drive wheels. The traveling driving force output device 200 includes, for example, a combination of an internal combustion engine, an electric motor, and a transmission, and a power ECU (Electronic Control Unit) that controls these. The power ECU controls the above configuration according to the information input from the driving controller 140 or the information input from the driving operator 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to the information input from the driving controller 140 or the information input from the driving operator 80 so that the brake torque according to the brake operation is output to each wheel. The brake device 210 may include, as a backup, a mechanism for transmitting the hydraulic pressure generated by the operation of the brake pedal included in the driving operator 80 to the cylinder via a master cylinder. The brake device 210 is not limited to the configuration described above, and may be an electronically controlled hydraulic brake device that controls an actuator according to the information input from the driving controller 140 to transmit the hydraulic pressure of the master cylinder to the cylinder. Further, a regenerative brake of an electric motor included in the traveling driving force output device 200 may be included.

The HMI controller 150 causes the HMI 30 to output various information. For example, the HMI controller 150 displays a first image showing the speed range controllable by the driving controller 140, a second image showing the target vehicle speed of the vehicle M, and a third image showing the speed of the vehicle M on the display device 32. The details of the function of the HMI controller 150 will be described later.

Figure 3:
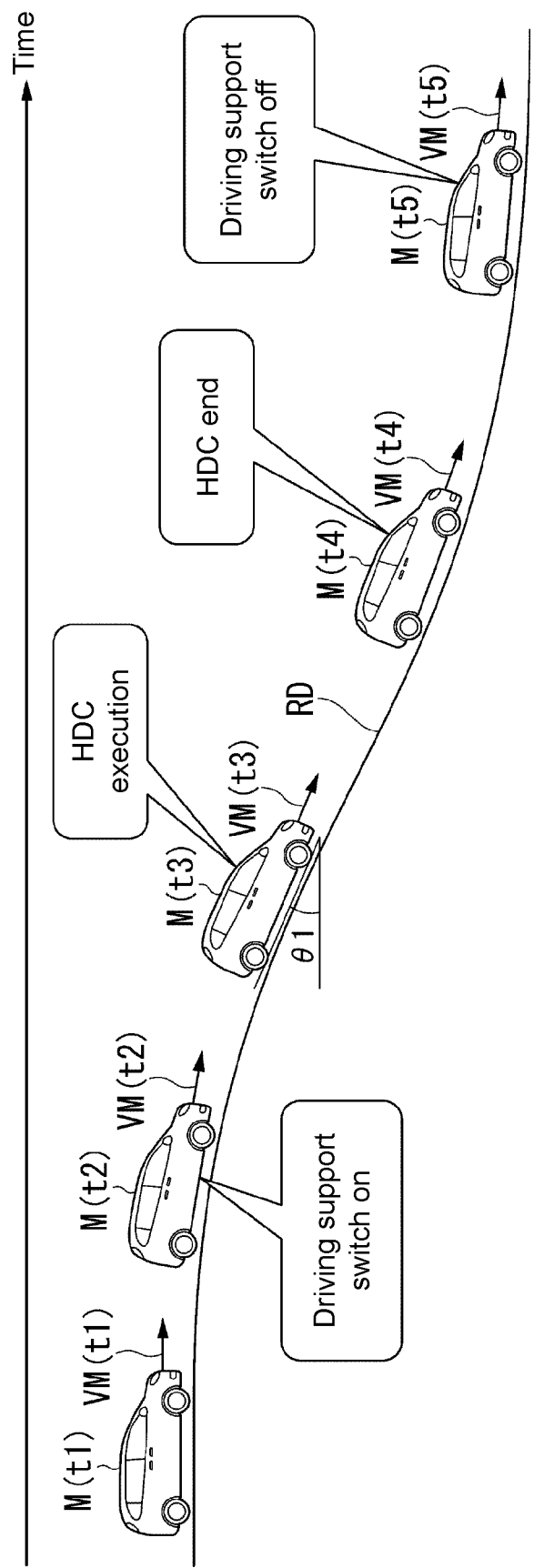
FIG. 3 is a diagram for illustrating the HDC executed by the driving controller 140.

Next, a display content according to the driving control of the vehicle system 1 will be specifically described. Hereinafter, the HDC will be used as an example of the driving control. In addition, the driving support switch 34 receives the start instruction or the end instruction of the HDC. Further, in the following description, it is assumed that the first display part 32A is an indicator (IND) and the second display part 32B is an MID. FIG. 3 is a diagram for illustrating the HDC executed by the driving controller 140. In FIG. 3, it is assumed that the time t1 is the earliest and the times t2, t3, t4, and t5 are delayed in this order. Further, the position and the vehicle speed of the vehicle M at the time t* when the vehicle M travels on a downhill road RD are respectively displayed as M(t*) and VM(t*).

In the example of FIG. 3, the occupant of the vehicle M operates the driving support switch 34 at the time when the vehicle M starts traveling on the downhill road RD (the time t2 in the drawing) to give the start instruction of the HDC. When the start instruction of the HDC is received by the driving support switch 34, the determination part 130 determines the operation condition of the speed controller 142 and the execution condition of speed control of the speed controller 142, and the HDC of the speed controller 142 is executed at the time when the operation condition and the execution condition are satisfied (the time t3 in the drawing). In this case, the speed controller 142 controls the speed VM of the vehicle M to approach the target vehicle speed within the controllable speed range so that the speed VM becomes a constant speed. The constant speed may include a predetermined speed range. For example, assuming that the constant speed is 14 [km/h], a predetermined speed range of, for example, 13 to 15 [km/h] may be included. The HMI controller 150 displays the image according to the state of the driving control of the HDC on the display device 32.

Figure 4:
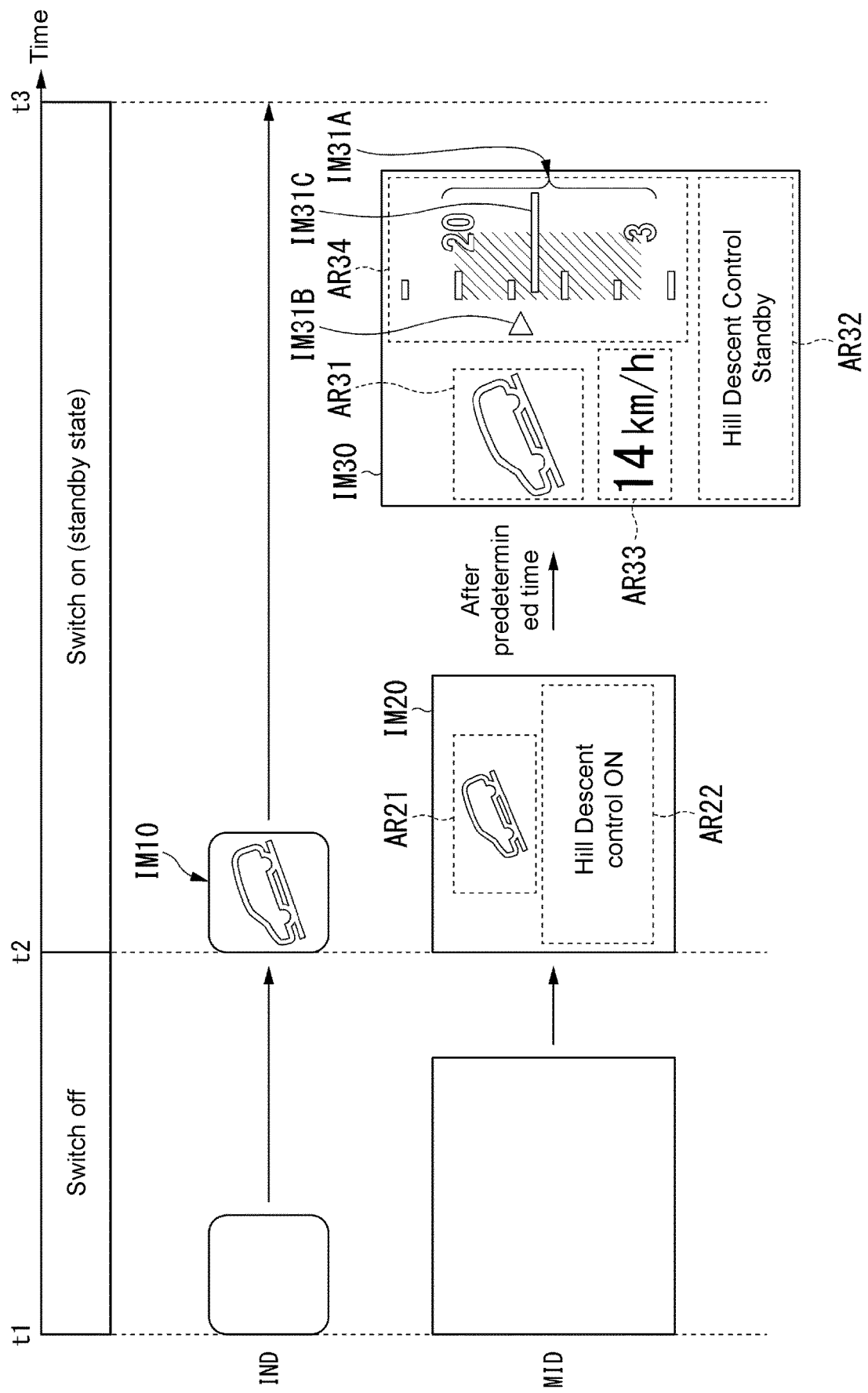
FIG. 4 is a diagram showing an example of the images displayed on the display device 32 at the times t1 to t3.

FIG. 4 is a diagram showing an example of the images displayed on the display device 32 at the times t1 to t3. The layout and display contents of the images shown in FIG. 4 are not limited thereto. The same applies to the following description of the images. First, at the time point of the time t1, the driving support switch 34 does not receive the start instruction of the HDC (switch off state). Therefore, the HMI controller 150 does not display anything on the IND and the MID.

Next, when the driving support switch 34 receives the start instruction of the HDC at the time point of the time t2, the HMI controller 150 causes the IND and the MID to display the images indicating that the start instruction of the HDC is received. The HMI controller 150 causes the IND to display an abstract image IM10 showing the state of the vehicle M (specifically, a state where the vehicle M travels downhill). The abstract image includes, for example, an icon image. Further, the HMI controller 150 causes the MID to display an image IM20 including a display area AR21 for displaying an image showing the state of the vehicle M and a display area AR22 for displaying an image indicating that the start instruction of the HDC is received. In the display area AR21, for example, an image similar to the image IM10 is displayed. In the display area AR22, for example, an image of character information such as "Hill Descent Control ON" is displayed as information indicating that the start instruction of the HDC is received.

Next, the determination part 130 determines whether the operation condition for operating the speed controller 142 is satisfied. The operation condition includes, for example, the following conditions (01) and (02).

Condition (01): a state where the vehicle M is not executing the driving control (for example, ACC).

Condition (02): the speed VM of the vehicle M is equal to or lower than the predetermined speed.

The predetermined speed refers to, for example, an upper limit value of the speed range controllable by the speed controller 142. For example, when the controllable speed range is 3 to 20 [km/h], the predetermined speed is 20 [km/h]. The predetermined speed may be changed according to the road surface condition and the gradient angle of the downhill road RD. Hereinafter, the controllable speed range is 3 to 20 [km/h], and the predetermined speed is 20 [km/h].

The determination part 130 determines that the operation condition is satisfied when the conditions (01) and (02) are satisfied, and determines that the operation condition is not satisfied when the condition (01) or (02) is not satisfied. When it is determined that the operation condition is satisfied, the driving controller 140 operates the speed controller 142. Then, the HMI controller 150 causes the MID to display a standby state image IM30 indicating that the travel control is in the standby state (execution standby state). The standby state image IM30 includes display areas AR31 to AR34. In the display area AR31, for example, an image similar to the image IM10 is displayed. In the display area AR32, for example, an image of character information such as "Hill Descent Control Standby" is displayed as information indicating that the speed controller 142 is in the standby state. In the display area AR33, an image showing the target vehicle speed of the vehicle M is displayed.

In the display area AR34, an image showing information related to the speed of the vehicle M is displayed. The image showing the information related to the speed of the vehicle M includes a first image IM31A showing the speed range controllable by the speed controller 142, a second image IM31B showing the target vehicle speed of the vehicle M, and a third image IM31C showing the speed VM of the vehicle M. The first image IM31A is, for example, a speedometer image in which a scale is shown for each predetermined speed, and the speed range controllable by the speed controller 142 is shown in a visible display mode. The second image IM31B is displayed at the position of the scale associated with the target vehicle speed among the speed scales shown in the speedometer image of the first image IM31A. Further, the third image IM31C is displayed at the position of the scale associated with the speed VM of the vehicle M among the speed scales shown in the speedometer image of the first image IM31A. Thus, based on the display positions of the second image IM31B and the third image IM31C, the occupant can recognize the current target vehicle speed and the speed VM of the vehicle M from the scale of the first image IM31A. In the example of FIG. 4, the second image IM31B is displayed at the position of 14 [km/h] of the speedometer image, and the third image IM31C is displayed at the position of 13 [km/h] of the speedometer image. The display modes of the first image IM31A, the second image IM31B, and the third image IM31C are not limited thereto. By displaying the standby state image IM30 on the MID, the occupant can more clearly recognize the target vehicle speed and the speed VM of the vehicle M with respect to the speed range controllable by the speed controller 142.

The HMI controller 150 displays the image IM20 on the MID for a predetermined time (for example, 2 seconds) and then displays the standby state image IM30. As a result, it is possible to prevent the occupant from missing the information displayed on the image IM20. Further, the HMI controller 150 continuously displays the image IM10 on the IND while the standby state image IM 30 is displayed.

In addition, when the determination part 130 determines that the above-described operation condition is not satisfied, the HMI controller 150 may display an error message on the display device 32. In this case, the HMI controller 150 displays information indicating the reason why the speed controller 142 cannot be operated. For example, when the above-described condition (01) is not satisfied, the HMI controller 150 displays on the MID an image showing an error message such as "HDC cannot be executed because cruise control is in operation". Further, when the above-described condition (02) is not satisfied, the HMI controller 150 displays on the MID an image showing an error message such as "HDC cannot be started because the vehicle speed is high". In addition to (or instead of) displaying the above-described images, the HMI controller 150 may output audio information corresponding to a part or all of the information included in the image from a speaker or the like of the HMI 30. The same applies to the following description of the images.

Next, the driving control and display control at the time t3 will be described. The time t3 is the time when the HDC is executed. The determination part 130 determines whether the execution condition of the HDC is satisfied in the standby state of the HDC. The execution condition includes, for example, the following conditions (11) to (13).

Condition (11): a state where the occupant of the vehicle M is not operating the accelerator pedal and the brake pedal of the driving operator 80. In other words, the input of the accelerator operation and the brake operation is stopped.
Condition (12): the gradient angle of the downhill road RD on which the vehicle M travels (for example, the gradient angle θ1 shown in FIG. 3) is equal to or greater than a predetermined angle (for example, 7 degrees).
Condition (13): the speed VM of the vehicle M is within the speed range controllable by the speed controller 142.

The determination part 130 determines that the execution condition is satisfied when all the conditions (11) to (13) are satisfied, and determines that the execution condition is not satisfied when at least one of the conditions (11) to (13) is not satisfied. For example, when it is determined at the time t3 that the execution condition is satisfied, the driving controller 140 executes the HDC of the speed controller 142. Then, the HMI controller 150 causes the IND and the MID to display images showing that the travel control of the speed controller 142 is in the active state (execution state).

Figure 5:
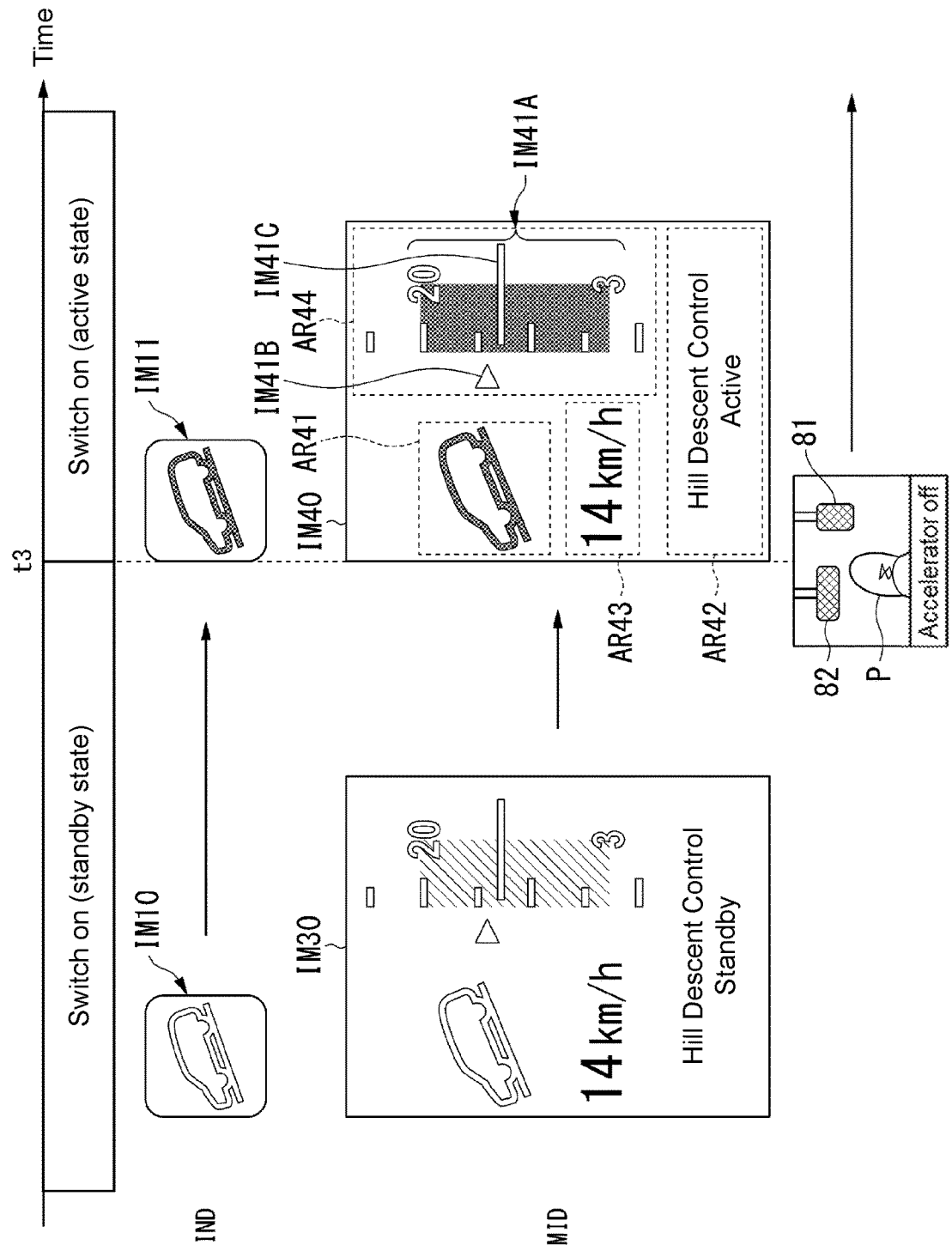
FIG. 5 is a diagram showing an example of the images displayed on the IND and the MID at the time t3.

FIG. 5 is a diagram showing an example of the images displayed on the IND and the MID at the time t3. When the travel control switches from the standby state to the active state, the HMI controller 150 displays images (active state image) with different display modes with respect to the image IM10 displayed on the IND and the standby state image IM30 displayed on the MID. The different display modes refer to, for example, different colors. In addition to (or instead of) changing the colors, the different display modes may refer to differentiating the size, line type, pattern, character font, and brightness of the image, or the display modes may be differentiated by blinking display or animation images.

For example, the HMI controller 150 causes the IND to display an active state image IM11 in which the color of the image IM10 is changed from a white color to a green or blue color. Further, the HMI controller 150 causes the MID to display an active state image IM40 in which the color of the image displayed in at least one of the display areas AR31 to AR34 included in the standby state image IM30 is changed from a white color to a green or blue color. The active state image IM40 includes display areas AR41 to AR44. Images of contents corresponding to the contents displayed in the display areas AR31 to AR34 are respectively displayed in the display areas AR41 to AR44.

In the display area AR41, the same green or blue color image as the image IM11 is displayed. Further, in the display area AR42, for example, an image of character information such as "Hill Descent Control Active" is displayed as information indicating that the travel control is in the execution state (active state). In addition, in the display area AR44, at least one display mode, among the first image IM41A showing the speed range controllable by the speed controller 142, the second image IM41B showing the target vehicle speed of the vehicle M, and the third image IM41C showing the speed VM of the vehicle M, is displayed differently from the display mode in the standby state. In the example of FIG. 5, the HMI controller 150 displays the first image IM41A in a green or blue color, and displays the second image IM41B and the third image IM41C in the same white color. When switching from the standby state to the active state, by differentiating the display modes of the images displayed, the occupant can more clearly recognize that the HDC is executed.

Next, the display control when the target vehicle speed is changed (adjusted) in the period from the time t3 to the time t4 will be described with reference to the drawing. The times t3a to t3g in the following description indicate specific times in the period from the times t3 to t4.

Figure 6:
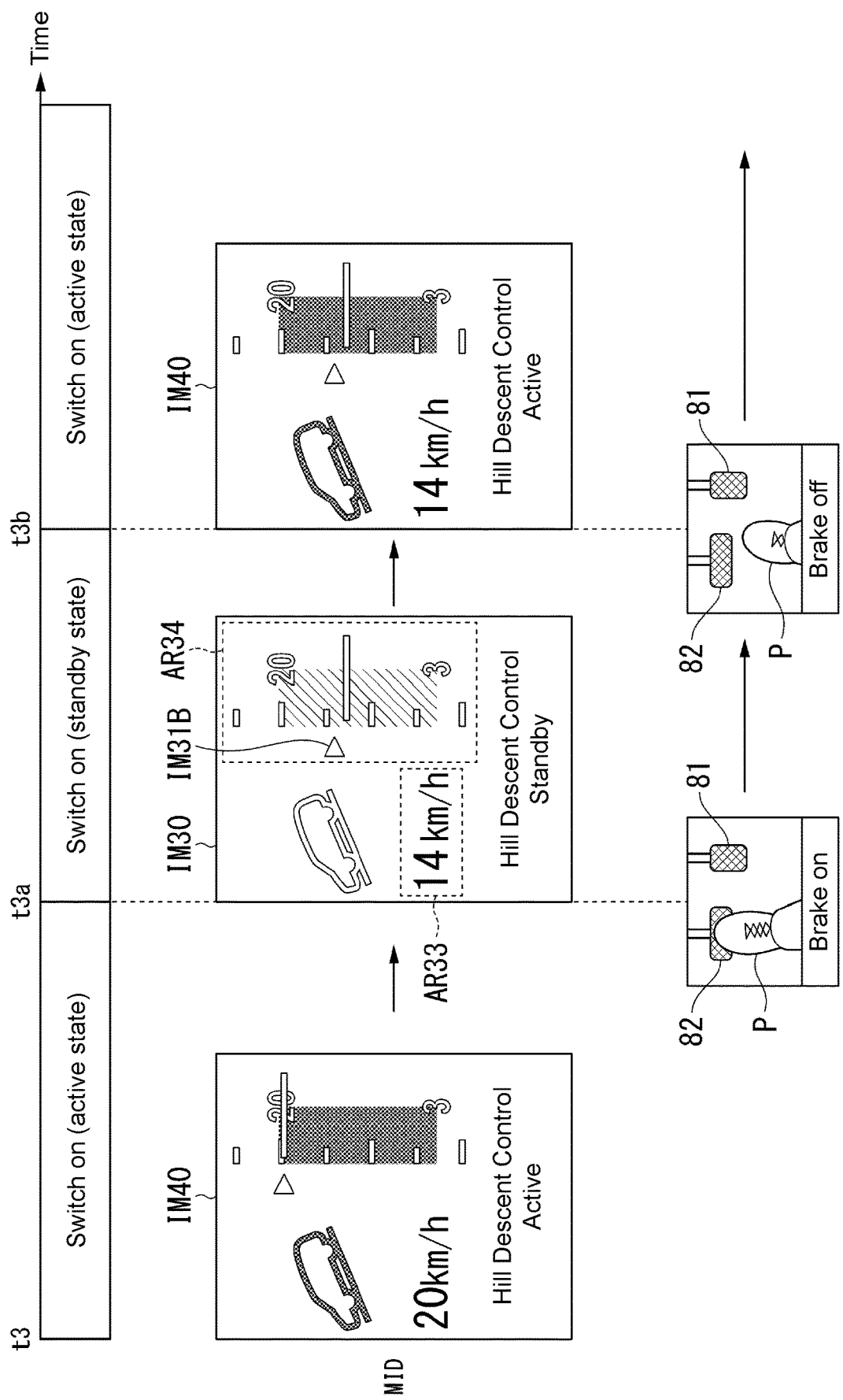
FIG. 6 is a diagram for illustrating a first example of display control when the target vehicle speed is changed.

FIG. 6 is a diagram for illustrating a first example of display control when the target vehicle speed is changed. Further, the display transition of the MID when the target vehicle speed is set will be described in the example of FIG. 6, and as for the IND, images (images IM10 and IM11) having the same display mode as the display areas AR31 and AR41 are displayed. The same applies to the following description of the drawings.

For example, when the occupant P operates the brake pedal 82 at the time t3a (the brake on state) after the HDC (speed control) is executed by the speed controller 142 at the time t3, the determination part 130 determines that the execution condition of the HDC is not satisfied. Then, the driving controller 140 switches the HDC of the speed controller 142 from the active state to the standby state. In this case, the HMI controller 150 switches the display mode from the active state image IM40 to the standby state image IM30 and displays it on the MID. Thus, it is easy for the occupant P to recognize that the state of the driving control of the vehicle M is changed.

Further, in the case of the standby state, the speed controller 142 changes the target vehicle speed by making the target vehicle speed follow the current vehicle speed VM of the vehicle M. In this case, the HMI controller 150 changes the display position of the third image IM31C in the display area AR34 of the standby state image IM30 in accordance with the speed of the vehicle M, and changes the numerical value of the target vehicle speed in the display area AR32 and the position of the second image IM31B in the display area AR34 according to the target vehicle speed that is changed following the speed VM. Thus, it is easy for the occupant P to recognize that the target vehicle speed is being changed.

For example, when the occupant P finishes the operation on the brake pedal 82 at the time t3b after the time t3a (the brake off state), the target vehicle speed is changed from 20 [km/h] to 14 [km/h] that follows the vehicle speed VM, and the changed target vehicle speed is registered in the speed information 162. When the execution condition of the HDC is satisfied at the time t3b, the speed controller 142 enters the active state, and the HDC is executed with the target vehicle speed set to 14 [km/h]. When the HDC of the speed controller 142 is executed, the HMI controller 150 switches from the standby state image IM30 to the active state image IM40 and displays it on the MID. Thus, the occupant can more clearly recognize the state of the vehicle M even in the control of changing the target vehicle speed. The example of FIG. 6 illustrates that the target vehicle speed is changed by the operation on the brake pedal 82, but the target vehicle speed may also be changed by the operation on the accelerator pedal 81.

Figure 7:
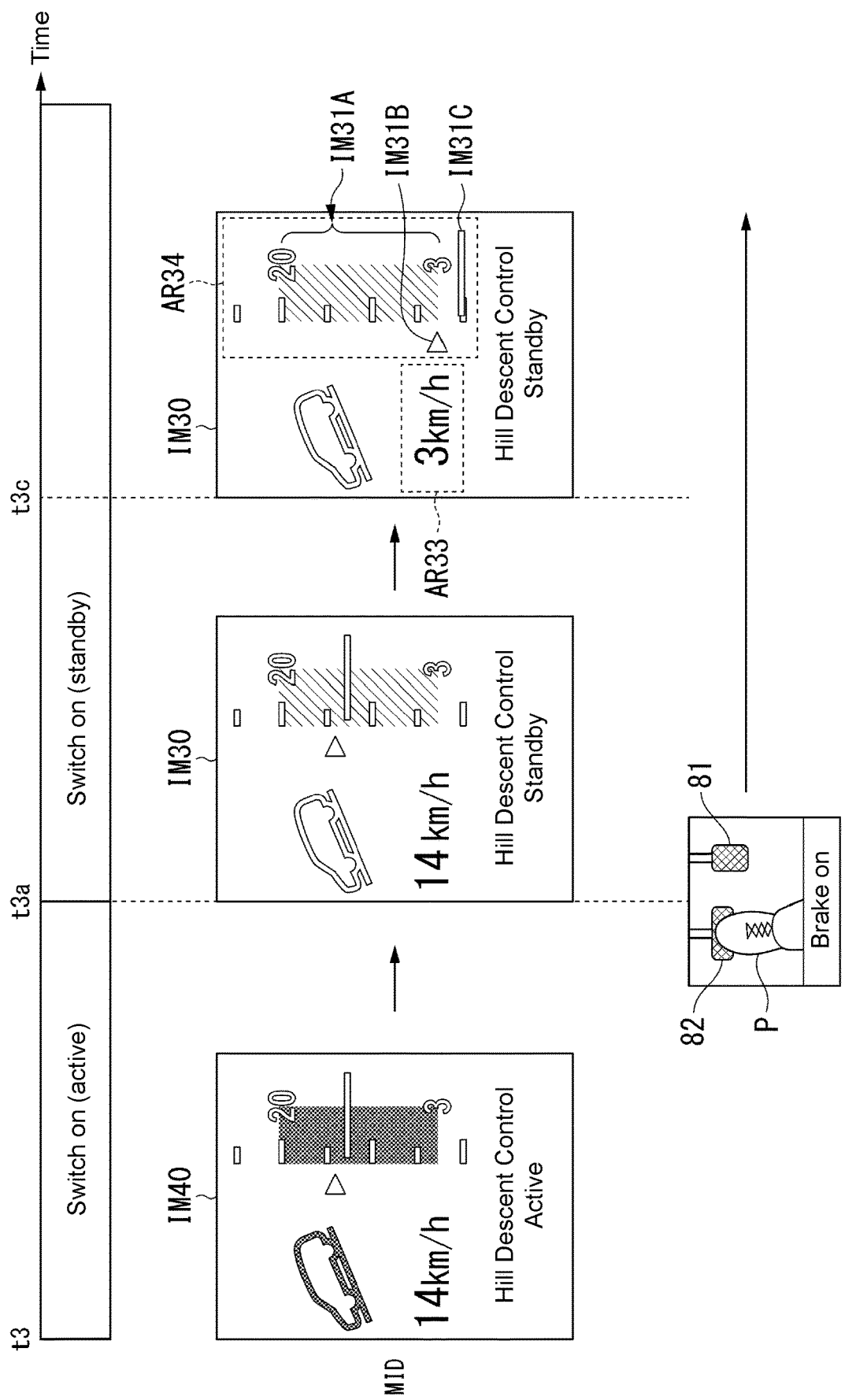
FIG. 7 is a diagram for illustrating a second example of display control when the target vehicle speed is changed.

FIG. 7 is a diagram for illustrating a second example of display control when the target vehicle speed is changed. The second example shows an example of display control when the target vehicle speed is changed to a speed lower than the speed range controllable by the speed controller 142. For example, as in FIG. 6, the change of reducing the target vehicle speed is started by the operation of the occupant P on the brake pedal 82 at the time t3a, and when the vehicle speed VM becomes lower than the lower limit (3 [km/h]) of the speed range controllable by the speed controller 142 at the time t3c after the time t3a, the HMI controller 150 displays the numerical value of the target vehicle speed in the display area AR33 of the standby state image IM30 and the position of the second image IM31B in the display area AR34 by fixing them to the position associated with the lower limit (3 [km/h]) of the controllable speed range. It is shown that the fixation of the second image IM31B is displayed in association with the lower limit of the first image IM31A. Thus, it is easy for the occupant P to recognize that the target vehicle speed cannot be changed to a speed lower than the lower limit value of the controllable speed range. When the operation on the brake pedal 82 is finished in a state where the speed VM of the vehicle M is lower than the speed range, the target vehicle speed is changed to the lower limit value (3 [km/h]).

Figure 8:
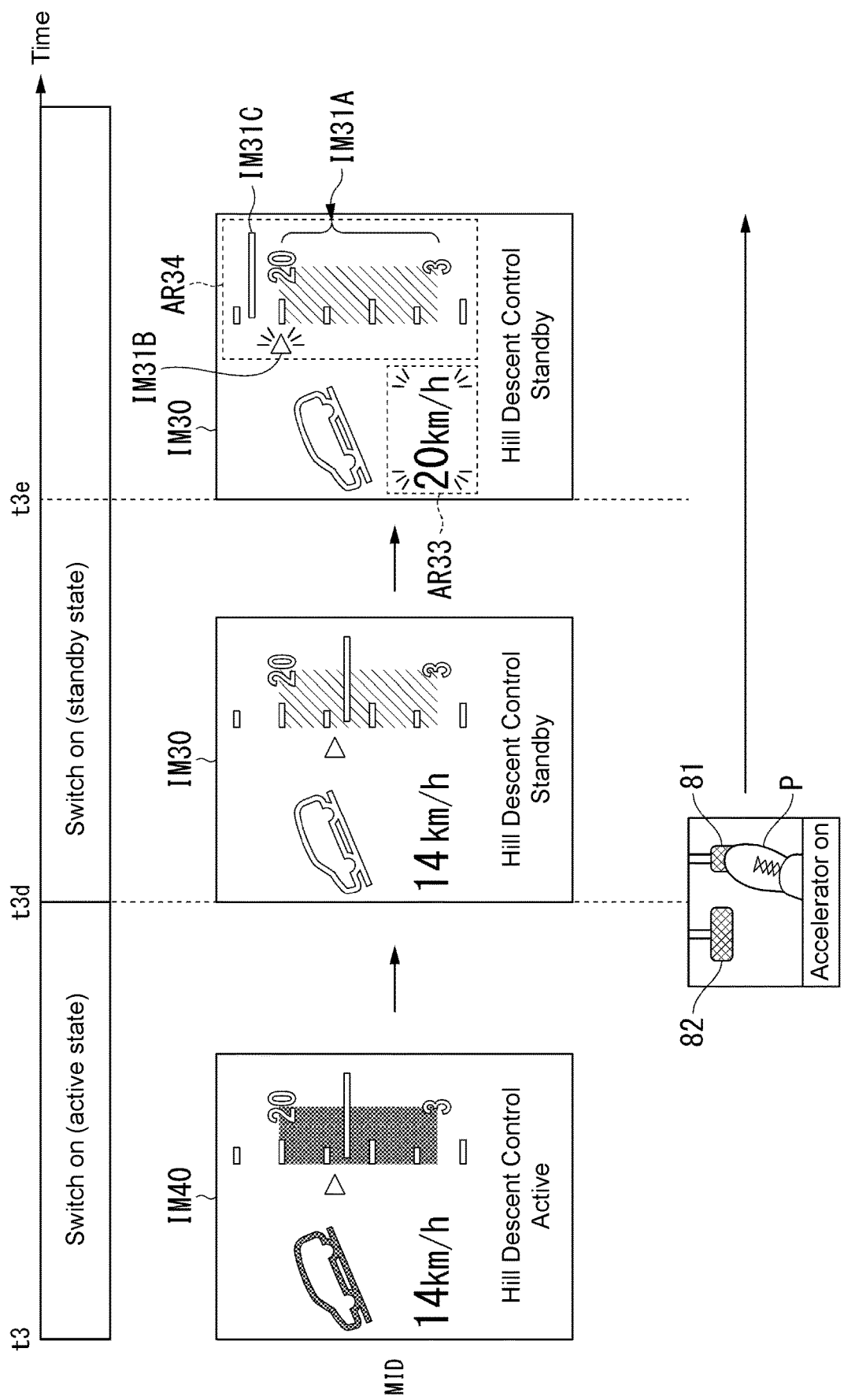
FIG. 8 is a diagram for illustrating a third example of display control when the target vehicle speed is changed.

FIG. 8 is a diagram for illustrating a third example of display control when the target vehicle speed is changed. The third example shows an example of display control when the target vehicle speed is changed to a speed higher than the speed range controllable by the speed controller 142. For example, when the accelerator pedal 81 of the occupant P is operated at the time t3d after the time t3 (the accelerator on state), the change of increasing the target vehicle speed is started based on the operation of the accelerator pedal 81 in the standby state. Further, when the vehicle speed VM becomes higher than the upper limit (20 [km/h]) of the speed range controllable by the speed controller 142 at the time t3e after the time t3d, the HMI controller 150 displays the numerical value of the target vehicle speed in the display area AR32 of the standby state image IM30 and the position of the second image IM31B in the display area AR34 by fixing them to the position associated with the upper limit (20 [km/h]) of the controllable speed range. It is shown that the fixation of the second image IM31B is displayed in association with the upper limit of the first image IM31A.

Thus, it is easy for the occupant P to recognize that the target vehicle speed cannot be changed to a speed higher than the upper limit value of the controllable speed range. Further, when the speed of the vehicle M becomes higher than 20 [km/h], the operation condition for entering the standby state is not satisfied. Therefore, the HMI controller 150 blinks the display of the second image IM31B of the standby state image IM30. Further, the HMI controller 150 may blink an image showing the target vehicle speed displayed in the display area AR32 in addition to (or instead of) the second image IM31B. By changing the display mode to be highlighted by blinking or the like in this way, the occupant P can be more clearly notified that the speed VM exceeds the upper limit value of the speed range. In addition, it is possible for the occupant P to prevent excessive speed during downhill traveling. The HMI controller 150 may perform highlighting display other than blinking (for example, display the target image or characters in a large size, display them in a conspicuous color or the like). Furthermore, when the speed VM of the vehicle M becomes higher than the speed range, the HMI controller 150 may output a message urging to lower the speed VM. Further, the HMI controller 150 may perform the above-described blinking display on the image displayed in association with the lower limit (3 [km/h]) of the controllable speed range shown in FIG. 7.

Figure 9:
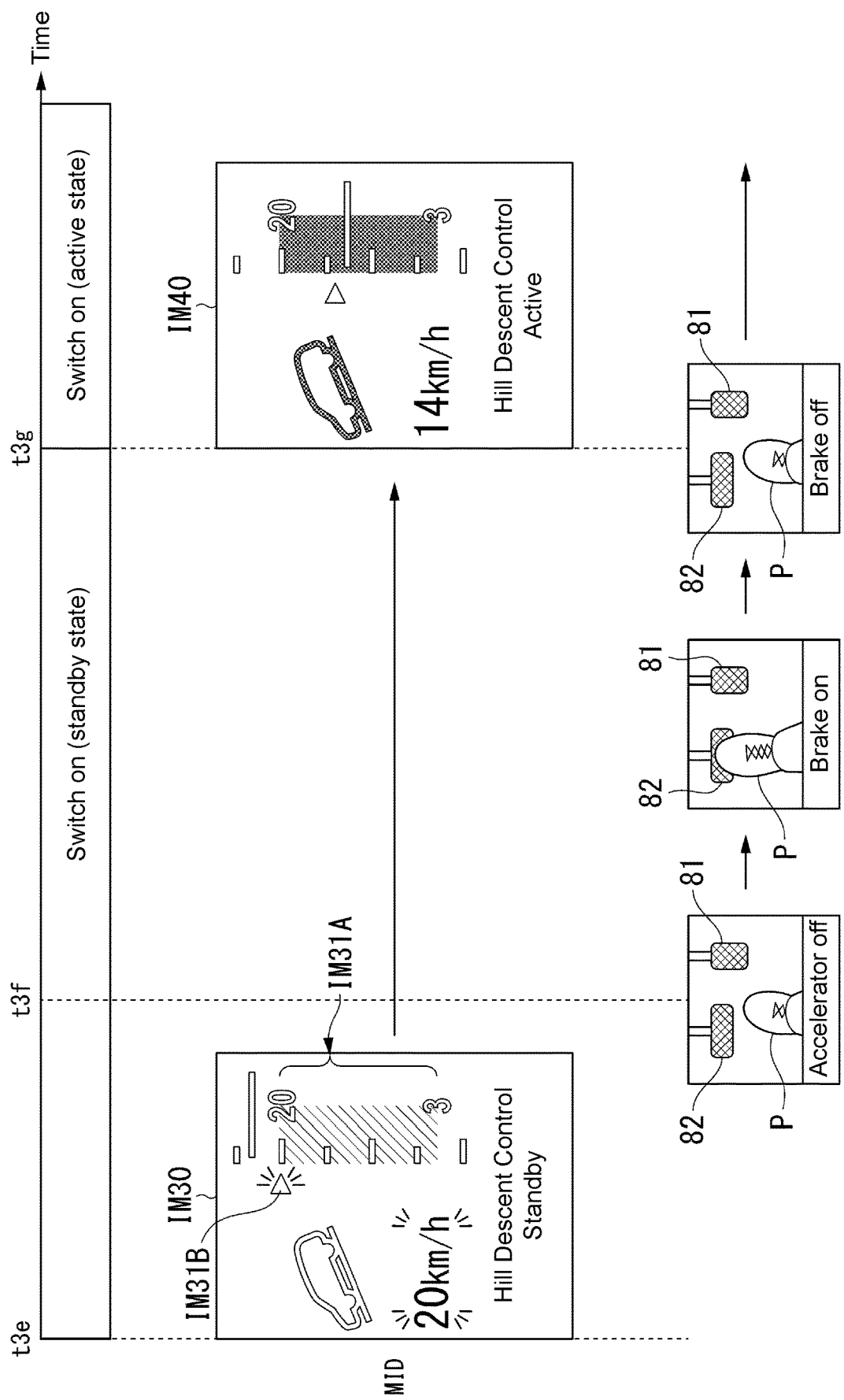
FIG. 9 is a diagram for illustrating an example of display control when the target vehicle speed is changed after the time t3e.

FIG. 9 is a diagram for illustrating an example of display control when the target vehicle speed is changed after the time t3e. The example of FIG. 9 shows a state where the occupant P finishes the operation on the accelerator pedal 81 (accelerator off) to operate the brake pedal 82 (brake on), and finishes the operation on the brake pedal 82 (brake off state) when the speed VM of the vehicle M is included in the speed range controllable by the speed controller 142 between the times t3f and t3g after the time t3e. In this case, the determination part 130 determines that the execution condition of the HDC of the speed controller 142 is satisfied. The speed controller 142 switches to the active state based on the determination result of the determination part 130. The HMI controller 150 causes the MID to display the active state image IM40 at the timing of entering the active state.

Figure 10:
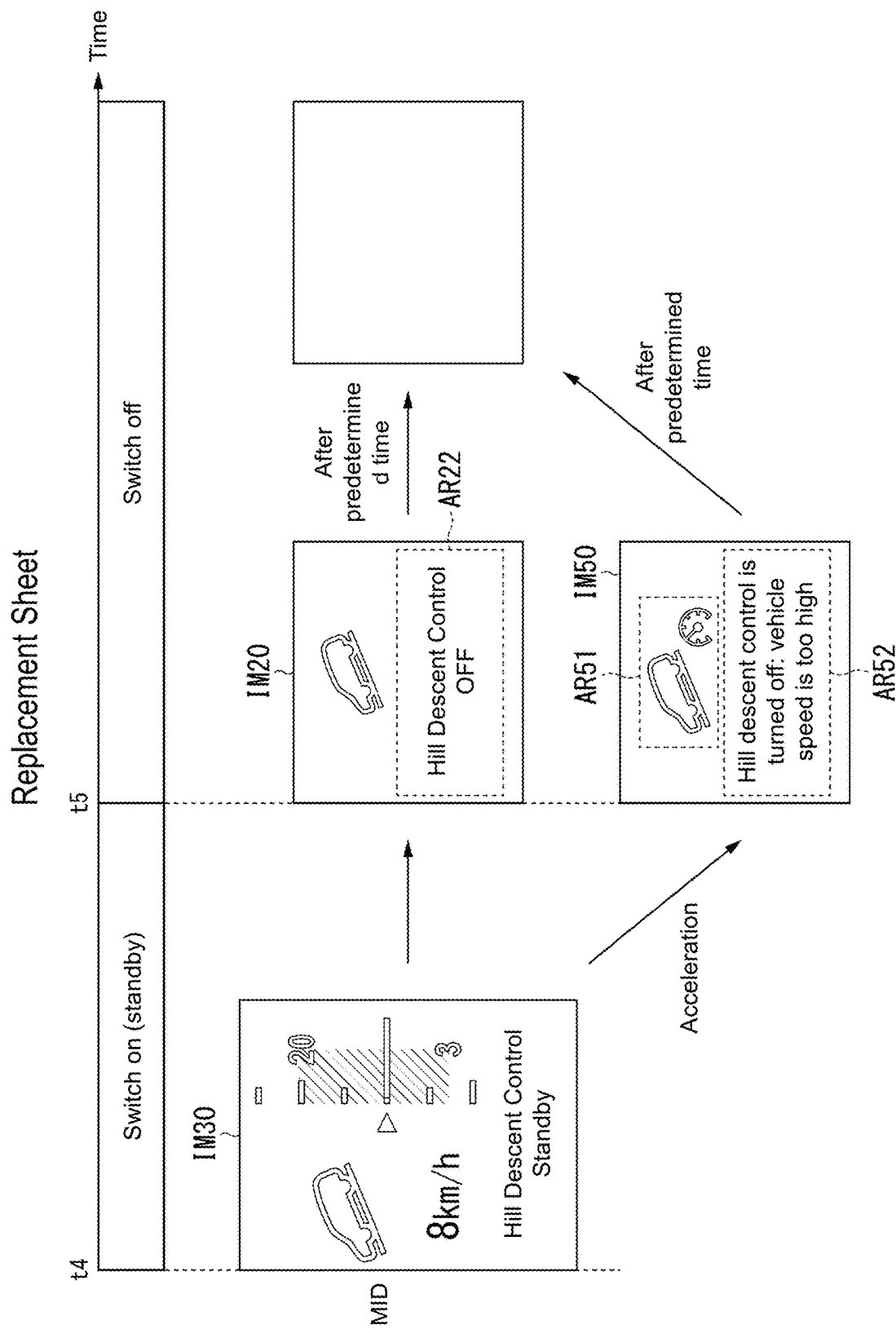
FIG. 10 is a diagram for illustrating display control based on a state change of driving control after the time t4.

FIG. 10 is a diagram for illustrating display control based on a state change of driving control after the time t4. For example, it is assumed that the gradient angle θ1 of the downhill road RD on which the vehicle M travels is smaller than a predetermined angle at the time t4. In this case, the execution condition of the HDC is not satisfied, and the driving controller 140 switches from the active state to the standby state. The HMI controller 150 causes the MID to display the standby state image IM30.

Further, when the driving support switch 34 receives the end instruction of the driving control (for example, driving support switch off) at the time t5, the image IM20 is displayed on the MID. In the display area AR22, an image of character information such as "Hill Descent Control OFF" is displayed as information indicating that the driving support switch 34 is turned off. Then, the HMI controller 150 ends the display of the image IM20 after displaying the image IM20 for a predetermined time (for example, 2 [seconds]).

In addition, instead of turning off the driving support switch 34, the driving controller 140 may forcibly terminate the HDC when the occupant P operates the accelerator pedal 81 and the speed VM of the vehicle M exceeds a predetermined speed (for example, 60 [km/h]). In this case, the HMI controller 150 causes the MID to display an image IM50 showing that the HDC is terminated by the speed VM of the vehicle M exceeding the predetermined speed. In the example of FIG. 10, because the speed VM of the vehicle M exceeds the predetermined speed at the time t5, the image IM50 is displayed. The image IM50 includes an icon display area AR51 and a character information display area AR52. In the icon display area AR51, an abstract image showing that the vehicle is going down a slope and an abstract image showing a speedometer are displayed. In the character information display area AR52, an image showing character information indicating that the control state of the vehicle M is changed is displayed. In the example of FIG. 10, character information such as "Hill descent control is turned off: vehicle speed is too high" is displayed in the character information display area AR52. Further, the HMI controller 150 ends the display of an image IM70 after displaying the image IM50 for a predetermined time. The predetermined time in this case may be the same as the predetermined time (for example, [2 seconds]) from the display of the image IM20 to the end of the display, or may be a different time. Thus, it is easy for the occupant P to know that the driving control of the driving controller 140 is ended.

When the display changeover switch 36 receives an instruction to set the display of the above-described image showing the state of the vehicle M to non-display during operation (standby state) or execution (active state) of the driving control, the HMI controller 150 may not display the standby state image and the active state image described above. As described above, the switching between the standby state and the active state of the HDC is determined not based on the intention of the occupant but based on the system side conditions such as the operation condition and the execution condition. Therefore, the display switching may be annoying for some occupants. Hence, when the display changeover switch 36 receives the instruction of non-display, the display as described above is not performed even if the state is switched. In addition, the HMI controller 150 may not display the image on the MID but continue to display the image on the IND. As a result, the occupant can recognize the state of the vehicle M to a minimum level through the IND.

When the display changeover switch 36 receives an instruction to display the image again, the HMI controller 150 redisplays the image based on the state (standby state and active state) of the vehicle M described above.

[Processing Flow]

Figure 11:
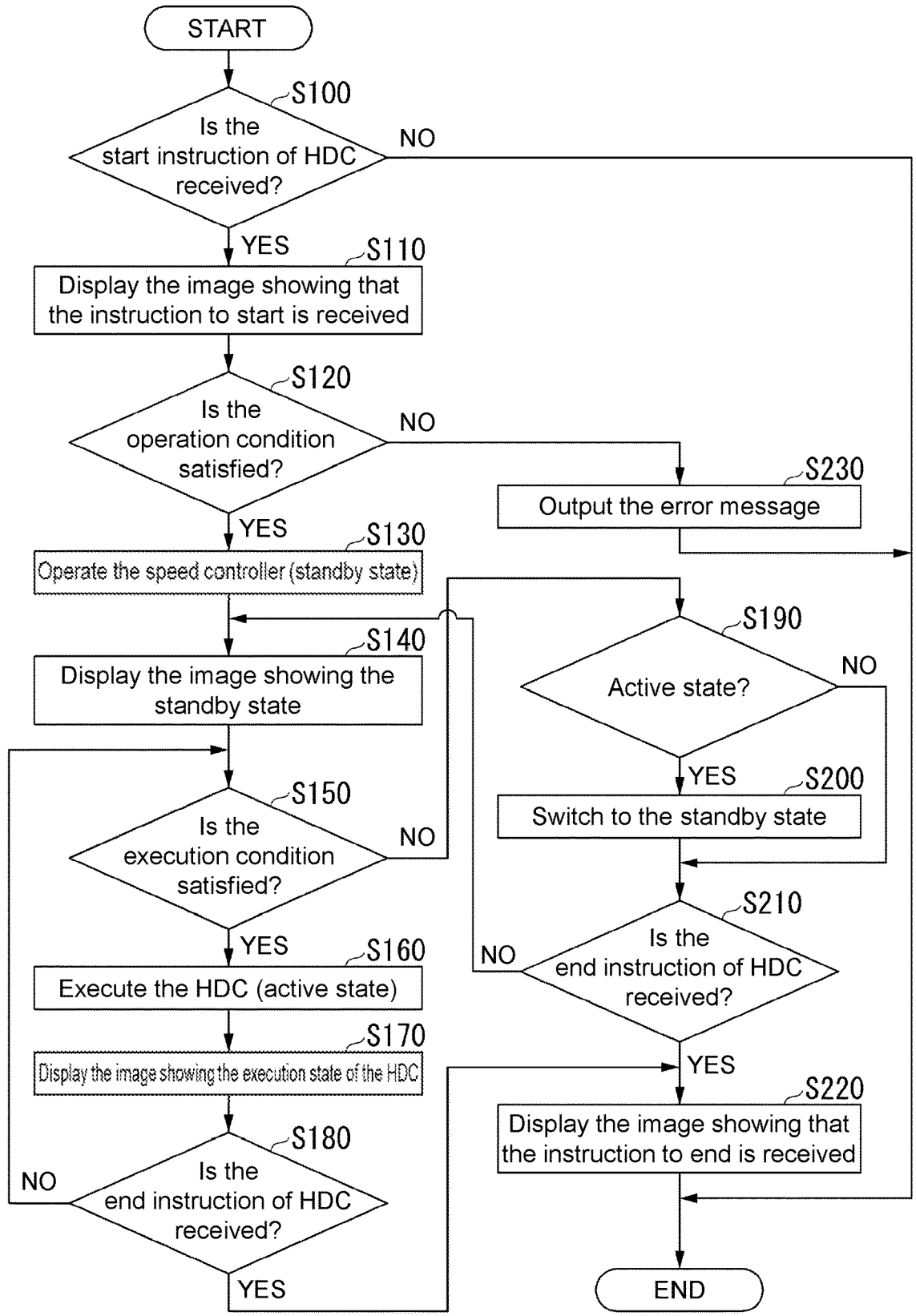
FIG. 11 is a flowchart showing an example of the flow of processing executed by the driving support device 100 of an embodiment.

FIG. 11 is a flowchart showing an example of the flow of processing executed by the driving support device 100 of the embodiment. In the following processing, the display control processing according to the content of the driving control performed by the driving controller 140 will be mainly described. Furthermore, the following describes constant speed travel control (HDC) on a downhill as an example of the driving control.

In the example of FIG. 11, the determination part 130 determines whether an execution instruction of the HDC is received by the driving support switch 34, for example (step S100). When it is determined that the execution instruction of the HDC is received, the HMI controller 150 causes the display device 32 to display an image showing that the start instruction of the HDC is received (step S110).

Next, the determination part 130 determines whether the operation condition of the speed controller 142 is satisfied based on the recognition result of the recognition part 120 (step S120). When it is determined that the operation condition is satisfied, the driving controller 140 operates the speed controller 142 to set to the standby state (step S130). The HMI controller 150 causes the display device 32 to display an image showing that the control of the speed controller 142 is in the standby state (step S140).

Next, the determination part 130 determines whether the execution condition of the HDC is satisfied (step S150). When it is determined that the execution condition is satisfied, the speed controller 142 executes the HDC (step S160). The state where the HDC is being executed is the active state. Next, the HMI controller 150 causes the display device 32 to display an image showing the execution state of the HDC (step S170).

Next, the determination part 130 determines whether the end instruction of the HDC is received by the driving support switch 34, for example (step S180). If it is determined that the end instruction of the HDC is received, the processing returns to step S150. If it is determined in the process of step S150 that the execution condition is not satisfied, the determination part 130 determines whether the speed controller 142 is in the active state (step S190). If it is determined that the speed controller 142 is in the active state, the state of the speed controller 142 is switched to the standby state (step S200). When it is determined that the speed controller 142 is not in the active state after the process of step S200 or in the process of step S190, the determination part 130 determines whether the end instruction of the HDC is received by the driving support switch 34 (step S210). When it is determined that the end instruction of the HDC is not received, the processing returns to step S140.

When it is determined in the process of step S180 or step S210 that the end instruction of the HDC is received, the HMI controller 150 causes the display device 32 to display an image showing that the end instruction is received (step S220). Thereby, the processing of this flowchart is ended.

Furthermore, when it is determined in the process of step S120 that the operation condition of the HDC is not satisfied, the HMI controller 150 outputs an error message and ends the processing of this flowchart (step S230). In addition, when it is determined in the process of step S100 that the start instruction of the HDC is not received, the processing of this flowchart is ended.

In the embodiment, when the display changeover switch 36 receives an instruction as to whether to display an image, processing of displaying or not displaying the image may be performed based on the received instruction, in addition to the processing shown in FIG. 11.

Figure 12:
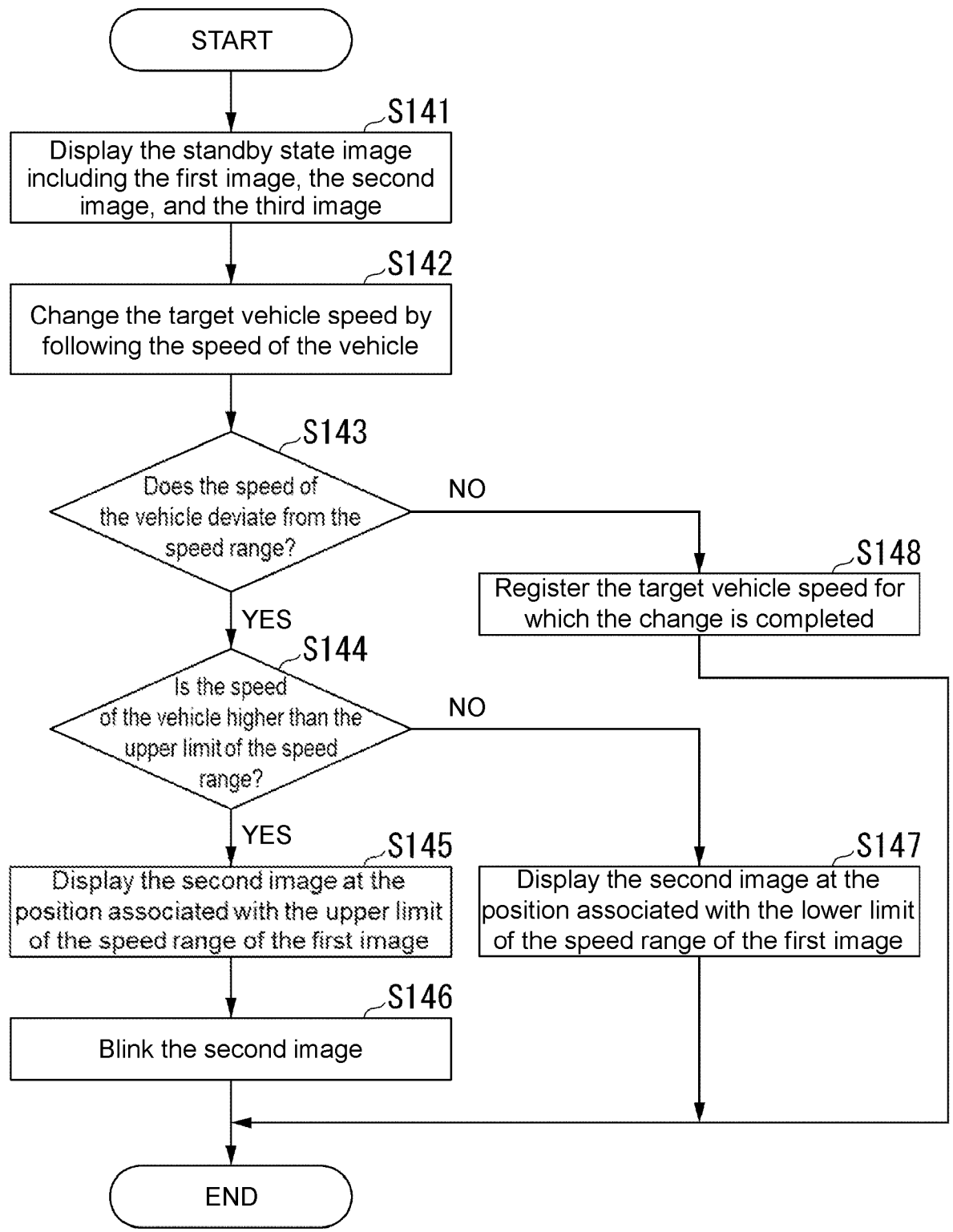
FIG. 12 is a flowchart showing an example of the flow of processing of changing the target speed.

Next, the flow of processing of changing the target vehicle speed executed when the speed controller 142 is in the standby state in the processes of step S130 and step S140 will be described. FIG. 12 is a flowchart showing an example of the flow of processing of changing the target speed. In FIG. 12, the HMI controller 150 causes the display device 32 to display the standby state image, which includes the first image showing the speed range controllable by the speed controller 142, the second image showing the target vehicle speed, and the third image showing the vehicle speed (step S141). Next, the speed controller 142 changes the target vehicle speed by following the speed VM of the vehicle M based on the operation of the occupant on the accelerator pedal 81 or the brake pedal 82 (step S142). Next, the speed controller 142 determines whether the speed VM of the vehicle M deviates from the speed range controllable by the speed controller 142 (step S143). When it is determined that the speed VM deviates from the speed range, the speed controller 142 determines whether the speed VM is higher than the upper limit of the speed range (step S144). When it is determined that the vehicle speed is higher than the upper limit of the speed range, the HMI controller 150 displays the second image by fixing it to the position associated with the upper limit of the speed range of the first image (step S145), and blinks the second image to be displayed (step S146). The display of the process in step S145 corresponds to displaying the second image in association with the upper limit of the first image.

Furthermore, when it is determined in the process of step S143 that the speed VM is not higher than the upper limit of the speed range, the speed VM may be lower than the lower limit of the speed range. Therefore, the HMI controller 150 displays the second image by fixing it to the position associated with the lower limit of the speed range of the first image. This display corresponds to displaying the second image in association with the lower limit of the first image. Moreover, when it is determined in the process of step S143 that the speed of the vehicle does not deviate from the speed range, once the occupant finishes the operation on the accelerator pedal 81 or the brake pedal 82, the target vehicle speed for which the change is completed is registered in the speed information 162 or the like (step S148). As a result, the processing of this flowchart is ended. After the processes in steps S146 and S147 are ended, the processing may return to step S141 to be continued. Further, in the process of step S144, instead of determining whether the speed VM is higher than the upper limit of the speed range, it may be determined whether the vehicle speed is lower than the lower limit of the speed range.

According to the above-described embodiment, in the display device (HMI 30 and HMI controller 150), the HMI controller (display controller) 150 is provided for displaying the first image showing the speed range controllable by the driving controller 140 that controls the speed of the vehicle M to a constant speed, the second image showing the target vehicle speed of the vehicle M, and the third image showing the speed of the vehicle M on the display device 32. The HMI controller 150 displays the second image at the position associated with the upper limit or the lower limit of the first image when the speed of the vehicle M deviates from the speed range, which makes it easy for the occupant to recognize the state of the driving control.

Specifically, according to the embodiment, since the display mode changes when the speed of the vehicle deviates from the speed range where the speed can be controlled to a constant speed, it is easy for the occupant to intuitively recognize the control state. Since the occupant does not have to pay attention to the display part and the line of sight of the occupant is less moved, it is easy to concentrate on driving.

Further, according to the embodiment, for example, in constant speed control (HDC) used in a low speed range and on a steep downward slope, the display mode of the image related to the vehicle state is changed depending on whether the accelerator pedal 81 or the brake pedal 82 is operated. Therefore, the occupant can easily recognize the change in the standby state or the active state of the low speed control. Further, according to the embodiment, for example, the icon image and the character information image are displayed in combination, so that the occupant can select and acquire rough information and detailed information according to the situation. Therefore, the burden of collecting information on the occupant can be reduced.

Although the above-described embodiment mainly illustrates speed control (constant speed control) such as HDC, the disclosure may also be executed on steering control of the vehicle M, instead of (or in addition to) the speed control. In that case, the operation condition and execution condition described above are changed to conditions for steering control.

The embodiment described above can be expressed as follows. A display device mounted on a vehicle includes a storage device that stores a program, a hardware processor, and a display part. The hardware processor executes the program stored in the storage device, by which a first image showing a speed range controllable by a driving controller that controls a speed of the vehicle to a constant speed, a second image showing a target vehicle speed of the vehicle, and a third image showing the speed of the vehicle are displayed on the display part. When the speed of the vehicle deviates from the speed range, the second image is displayed on the display part in association with an upper limit or a lower limit of the first image.

The forms for implementing the disclosure have been described above using the embodiments, but the disclosure is not limited to these embodiments, and various modifications and substitutions can be added without departing from the gist of the disclosure.

What is claimed is:

1. A display device mounted on a vehicle, the display device comprising:
    a display part; and
    a display controller displaying a first image showing a speed range controllable by a driving controller that controls a speed of the vehicle to a constant speed in a speedometer image in which a scale is shown for each predetermined speed, a second image showing a target vehicle speed of the vehicle and displaying at the position associated with the speed scales of the first image, a third image showing the speed of the vehicle and displaying at the position associated with the speed scales of the first image, and a numerical value of the target vehicle speed on the display part,
    wherein the driving controller executes speed from a standby state control when a state of the vehicle satisfies an execution condition of the speed control performed by the driving controller, and
    when the speed control performed by the driving controller enters an execution state, the display controller differentiates a display mode of the first image from a display mode of the standby state,
    wherein the display controller displays the second image in association with an upper limit or a lower limit of the first image on the display part when the speed of the vehicle deviates from the speed range while changing a display mode of the second image or the numerical value of the target vehicle speed, and displays the first image as the display mode of the standby state.

2. The display device according to claim 1, wherein the display controller displays the second image in association with the upper limit of the first image on the display part when the speed of the vehicle is higher than the upper limit of the speed range.

3. The display device according to claim 1, wherein the display controller displays the second image in association with the lower limit of the first image on the display part when the speed of the vehicle is lower than the lower limit of the speed range.

4. The display device according to claim 1, wherein the driving controller performs control of changing the target vehicle speed by an operation on a driving operator performed by an occupant of the vehicle, and
    the display controller displays the second image in association with the upper limit or the lower limit of the first image on the display part when the speed of the vehicle deviates from the speed range during execution of the control of changing the target vehicle speed.

5. The display device according to claim 2, wherein the driving controller performs control of changing the target vehicle speed by an operation on a driving operator performed by an occupant of the vehicle, and
    the display controller displays the second image in association with the upper limit or the lower limit of the first image on the display part when the speed of the vehicle deviates from the speed range during execution of the control of changing the target vehicle speed.

6. The display device according to claim 3, wherein the driving controller performs control of changing the target vehicle speed by an operation on a driving operator performed by an occupant of the vehicle, and
    the display controller displays the second image in association with the upper limit or the lower limit of the first image on the display part when the speed of the vehicle deviates from the speed range during execution of the control of changing the target vehicle speed.

7. The display device according to claim 1, further comprising a reception part for receiving an operation of the occupant of the vehicle, wherein the reception part comprising a driving support switch that receives a start instruction or an end instruction of the driving control performed by the driving controller; a display changeover switch for switching between display and non-display of an image on the display device, a microphone; and a touch panel,
    wherein when the driving support switch receives a start instruction of speed control of the vehicle, the display controller displays an image showing that the start instruction is received for a predetermined time on the display part, and then displays the first image, the second image, and the third image on the display part.

8. The display device according to claim 2, further comprising a reception part for receiving an operation of the occupant of the vehicle, wherein the reception part comprising a driving support switch that receives a start instruction or an end instruction of the driving control performed by the driving controller; a display changeover switch for switching between display and non-display of an image on the display device, a microphone; and a touch panel, wherein when the driving support switch receives a start instruction of speed control of the vehicle, the display controller displays an image showing that the start instruction is received for a predetermined time on the display part, and then displays the first image, the second image, and the third image on the display part.

9. The display device according to claim 3, further comprising a reception part for receiving an operation of the occupant of the vehicle, wherein the reception part comprising a driving support switch that receives a start instruction or an end instruction of the driving control performed by the driving controller; a display changeover switch for switching between display and non-display of an image on the display device, a microphone; and a touch panel, wherein when the driving support switch receives a start instruction of speed control of the vehicle, the display controller displays an image showing that the start instruction is received for a predetermined time on the display part, and then displays the first image, the second image, and the third image on the display part.

10. The display device according to claim 4, further comprising a reception part for receiving an operation of the occupant of the vehicle, wherein the reception part comprising a driving support switch that receives a start instruction or an end instruction of the driving control performed by the driving controller; a display changeover switch for switching between display and non-display of an image on the display device, a microphone; and a touch panel, wherein when the driving support switch receives a start instruction of speed control of the vehicle, the display controller displays an image showing that the start instruction is received for a predetermined time on the display part, and then displays the first image, the second image, and the third image on the display part.

11. The display device according to claim 7, wherein the display controller displays an image showing that execution of speed control performed by the driving controller is in a standby state together with the first image, the second image, and the third image on the display part.

12. The display device according to claim 7, wherein when the driving support switch receives an end instruction of speed control of the vehicle, the display controller ends display of the first image, the second image, and the third image, and displays an image showing that the end instruction is received for a predetermined time on the display part.

13. The display device according to claim 11, wherein when the driving support switch receives an end instruction of speed control of the vehicle, the display controller ends display of the first image, the second image, and the third image, and displays an image showing that the end instruction is received for a predetermined time on the display part.

14. A display control method for a computer of a display device mounted on a vehicle to display a first image showing a speed range controllable by a driving controller that controls a speed of the vehicle to a constant speed in a speedometer image in which a scale is shown for each predetermined speed, a second image showing a target vehicle speed of the vehicle and displaying at the position associated with the speed scales of the first image, a third image showing the speed of the vehicle and displaying at the position associated with the speed scales of the first image, and a numerical value of the target vehicle speed on a display part, and execute speed from a standby state control when a state of the vehicle satisfies an execution condition of the speed control performed by the driving controller, and when the speed control performed by the driving controller enters an execution state, the display controller differentiates a display mode of the first image from a display mode of the standby state, display the second image in association with an upper limit or a lower limit of the first image on the display part when the speed of the vehicle deviates from the speed range while changing a display mode of the second image or the numerical value of the target vehicle speed, and display the first image as the display mode of the standby state.

15. A non-transitory computer-readable recording medium storing a program for a computer of a display device mounted on a vehicle to display a first image showing a speed range controllable by a driving controller that controls a speed of the vehicle to a constant speed in a speedometer image in which a scale is shown for each predetermined speed, a second image showing a target vehicle speed of the vehicle and displaying at the position associated with the speed scales of the first image, a third image showing the speed of the vehicle and displaying at the position associated with the speed scales of the first image, and a numerical value of the target vehicle speed on a display part, and execute speed from a standby state control when a state of the vehicle satisfies an execution condition of the speed control performed by the driving controller, and when the speed control performed by the driving controller enters an execution state, the display controller differentiates a display mode of the first image from a display mode of the standby state, display the second image in association with an upper limit or a lower limit of the first image on the display part when the speed of the vehicle deviates from the speed range while changing a display mode of the second image or the numerical value of the target vehicle speed, and displays the first image as the display mode of the standby state.

* * * * *